(12) United States Patent
Masarwa et al.

(10) Patent No.: US 11,193,621 B2
(45) Date of Patent: Dec. 7, 2021

(54) IRRIGATION PIPE HAVING TENSILE STRIP

(71) Applicant: Netafim, Ltd., Tel Aviv (IL)

(72) Inventors: Abed Masarwa, Taybi (IL); Eliyahu Madar, Elihav (IL); Alexander Davidov, Alfei Menashe (IL)

(73) Assignee: Netafim, Ltd., Tel Aviv (IL)

( * ) Notice: Subject to any disclaimer, the term of this patent is extended or adjusted under 35 U.S.C. 154(b) by 0 days.

(21) Appl. No.: 17/069,240

(22) Filed: Oct. 13, 2020

(65) Prior Publication Data

US 2021/0071805 A1 Mar. 11, 2021

Related U.S. Application Data

(63) Continuation-in-part of application No. PCT/IB2019/053295, filed on Apr. 21, 2019.

(60) Provisional application No. 62/661,160, filed on Apr. 23, 2018.

(51) Int. Cl.
*F16L 57/02* (2006.01)

(52) U.S. Cl.
CPC .................................... *F16L 57/02* (2013.01)

(58) Field of Classification Search
CPC ........ A01G 25/023; A01G 25/06; F16L 57/02
USPC .................. 138/172, 174, 128, 156; 239/542
See application file for complete search history.

(56) References Cited

U.S. PATENT DOCUMENTS

| | | | | |
|---|---|---|---|---|
| 2,929,409 A | * | 3/1960 | Waehner | B21C 37/15 138/141 |
| 3,056,428 A | * | 10/1962 | Brown | A01G 23/14 138/118 |
| 4,025,675 A | * | 5/1977 | Jonda | E04C 2/36 428/36.2 |
| 4,307,841 A | * | 12/1981 | Mehoudar | A01G 25/023 239/542 |
| 5,141,360 A | | 8/1992 | Zeman | |
| 5,620,143 A | * | 4/1997 | Delmer | A01G 25/02 239/542 |
| 5,816,742 A | | 10/1998 | Cordewener | |
| 6,513,734 B2 | * | 2/2003 | Bertolotti | A01G 25/023 239/542 |
| 2006/0289075 A1 | * | 12/2006 | Diez | F16L 9/06 138/173 |
| 2007/0017591 A1 | * | 1/2007 | Barnhouse | F16L 3/26 138/172 |
| 2007/0039659 A1 | * | 2/2007 | Coel | F16L 11/115 138/173 |

(Continued)

FOREIGN PATENT DOCUMENTS

| | | |
|---|---|---|
| WO | WO 91/03155 | 3/1991 |
| WO | WO 2016/065497 | 5/2016 |

OTHER PUBLICATIONS

International Search Report dated Jul. 30, 2019, in counterpart International (PCT) Application No. PCT/IB2019/053295.

(Continued)

*Primary Examiner* — Patrick F Brinson
(74) *Attorney, Agent, or Firm* — Womble Bond Dickinson (US) LLP

(57) ABSTRACT

A thin walled irrigation pipe has a tensile layer formed as a continuous strip upon an outer side of the pipe for increasing tensile strength of the pipe. The tensile layer includes a higher tensile strength than material of the remainder of the pipe outside of the tensile layer.

24 Claims, 2 Drawing Sheets

(56) References Cited

U.S. PATENT DOCUMENTS

| | | | | |
|---|---|---|---|---|
| 2009/0217879 A1* | 9/2009 | Weisel | ................... | A01J 5/044 |
| | | | | 119/14.01 |
| 2010/0037972 A1* | 2/2010 | Pal | ....................... | F16L 11/118 |
| | | | | 138/121 |
| 2015/0014446 A1* | 1/2015 | Cohen | ................. | A01G 25/026 |
| | | | | 239/542 |

OTHER PUBLICATIONS

Written Opinion dated Jul. 30, 2019, in counterpart International (PCT) Application No. PCT/IB2019/053295.

* cited by examiner

11,193,621 B2

IRRIGATION PIPE HAVING TENSILE STRIP

RELATED APPLICATIONS

This is a Bypass Continuation-in-Part of International Patent Application No. PCT/IB2019/053295, filed Apr. 12, 2019 and published as WO 2019/207455A1, which claims priority to U.S. Provisional Application No. 62/661,160, filed Apr. 23, 2018. The contents of the aforementioned applications are incorporated by reference in their entirety.

TECHNICAL FIELD

Embodiments of the invention relate to an irrigation pipe, possibly a drip irrigation pipe.

BACKGROUND

Irrigation systems deliver liquid comprising water, often containing plant nutrients, pesticides and/or medications, to plants via networks of irrigation pipes.

Relative thin walled irrigation pipes, sometimes called tapes, may be used for irrigation, for example when the irrigation pipes are used for short durations of time, such as a single season and then possibly disposed.

During installment or use, the irrigation pipes may be exposed to wear and tear that may cause damage to the pipes in particular in cases where the irrigation pipe has a relative thin wall.

Irrigation pipes may deliver liquid to plants via emitters or drippers that are installed on or integrated inside the irrigation pipes. Such emitters may be heat bonded to the pipe to form a so-called drip irrigation pipe or dripper pipe. In some cases such dripper pipes may be susceptible to damage at the areas of bonding and/or areas of connection to the drip emitter.

SUMMARY

The following embodiments and aspects thereof are described and illustrated in conjunction with systems, tools and methods which are meant to be exemplary and illustrative, not limiting in scope.

In an embodiment there is provided a thin walled irrigation pipe having a tensile layer formed as a continuous strip upon an outer side of the pipe for increasing tensile strength of the pipe, wherein the tensile layer comprising a higher tensile strength than material of the remainder of the pipe outside of the tensile layer In addition to the exemplary aspects and embodiments described above, further aspects and embodiments will become apparent by reference to the figures and by study of the following detailed descriptions.

BRIEF DESCRIPTION OF THE FIGURES

Exemplary embodiments are illustrated in referenced figures. It is intended that the embodiments and figures disclosed herein are to be considered illustrative, rather than restrictive. The invention, however, both as to organization and method of operation, together with objects, features, and advantages thereof, may best be understood by reference to the following detailed description when read with the accompanying figures, in which.

Figure 1:
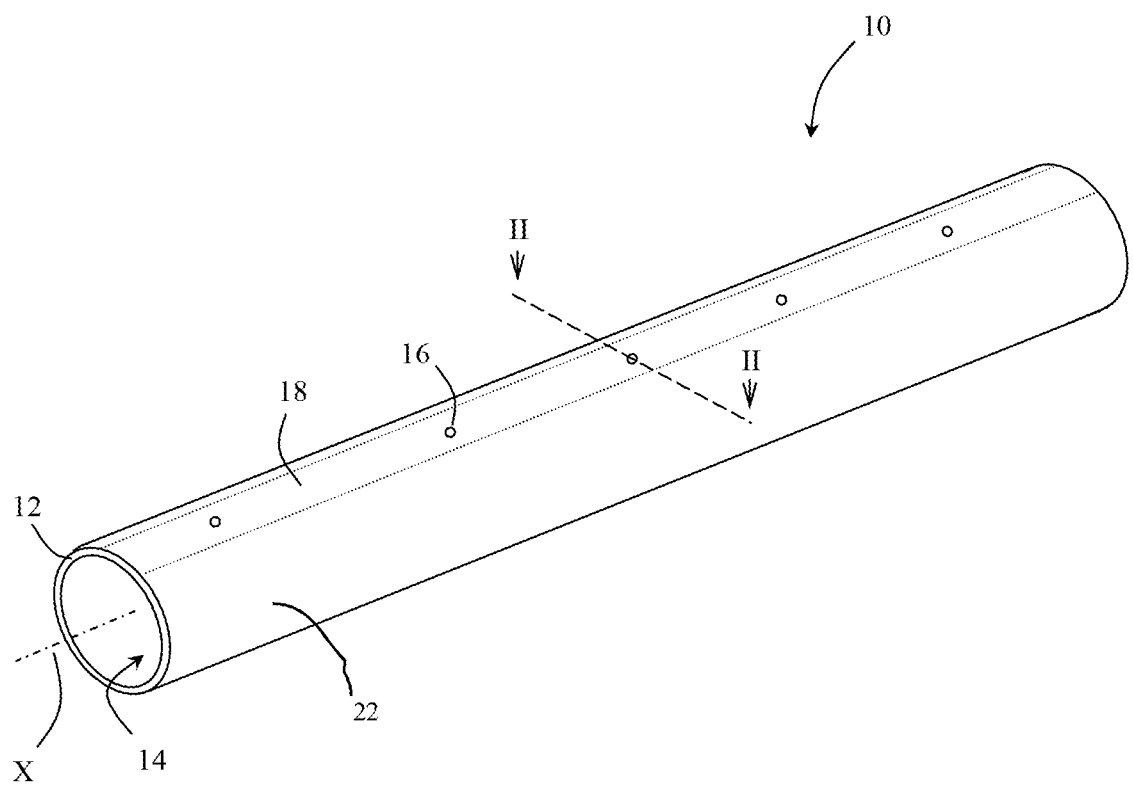
FIG. 1 schematically shows an irrigation pipe in accordance with at least certain embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

Attention is first drawn to FIG. 1 illustrating an irrigation pipe 10 in accordance with at least certain embodiments of the invention. The irrigation pipe has a pipe wall 12 formed about a longitudinal axis X of the pipe forming an internal through going lumen 14 serving as a main passageway of the pipe for axially channeling liquid through the pipe.

The pipe includes in addition openings 16 formed axially along the pipe's wall 12 serving as passageways through which liquid flowing through lumen 14 can exit the pipe. The openings 16 may take form of apertures drilled or punched through the pipe wall.

In an embodiment of the invention, the irrigation pipe may include an operative layer 18 formed along the pipe's wall possibly as here illustrated along areas of the wall including the openings 16. The operative layer, in various embodiments of the invention may serve as a tensile layer for increasing tensile strength of the pipe so as to increase the maximal stress that the pipe can withstand while e.g. being stretched or pulled.

The pipe 10 comprises a main pipe portion 22 and the aforementioned operative layer 18 (also referred to herein as "tensile layer 18"). The tensile layer 18 is formed of a first material and the main pipe 22 is formed of a second material. The first material has a higher tensile strength than the second material. The tensile layer 18 is configured such that an overall tensile strength of the pipe 10 is increased as compared to a pipe made of the second material and devoid of the tensile layer 18. In other words, the presence of the tensile layer 18 increases the tensile strength of the pipe 10. The main pipe portion 22 has a main outer surface 24 and a longitudinally extending recess 26 formed in the main outer surface 24. The tensile layer 18 is located in the longitudinally extending recess 24 and has an exposed outer surface 30. In the cross-sections seen in FIGS. 2A and 2B, the tensile layer 18 extends over only a portion of the pipe's circumferential periphery. In some embodiments, the arc of the tensile layer 18 may subtend an angle α which is between 2° and 10°. The tensile layer's exposed outer surface 30 is continuous with the adjacent main outer surface 24 of the main pipe portion 22. In other words, there is no step between where the tensile layer is present and circumferentially adjacent areas where there is no tensile layer. In some embodiments, there is no change in pipe radius in a circumferential direction crossing from the tensile layer's exposed outer surface 30 to the adjacent portion of the main outer surface 24. The pipe wall may have a constant thickness along its periphery. At the recess 26, the main pipe portion 22 has a first thickness and the tensile layer 18 has a second thickness. The first thickness may be greater than the second thickness. Also at the recess 26, the openings 18 ("apertures 18") pass through both the main pipe portion 22 and the tensile layer 18.

In various embodiments, provision of such tensile layer may be especially useful in so called thin-walled pipes sometimes called 'tapes'. Such a thin walled pipe structure may be characterized by a wall thickness that may range from about 0.127 (5 mil) to about 0.2032 millimeter (8 mil) (measured in a radial direction on a pipe held in a cylindrical state). Such relative thin wall thickness may render the pipes relative weak, inter alia, when exposed to tensile stresses, such as when laid or retrieved from a field. In the example exhibited in FIGS. 1 and 2, tensile layer 18 is illustrated formed at least along an outer side of wall 12.

Figure 2A:
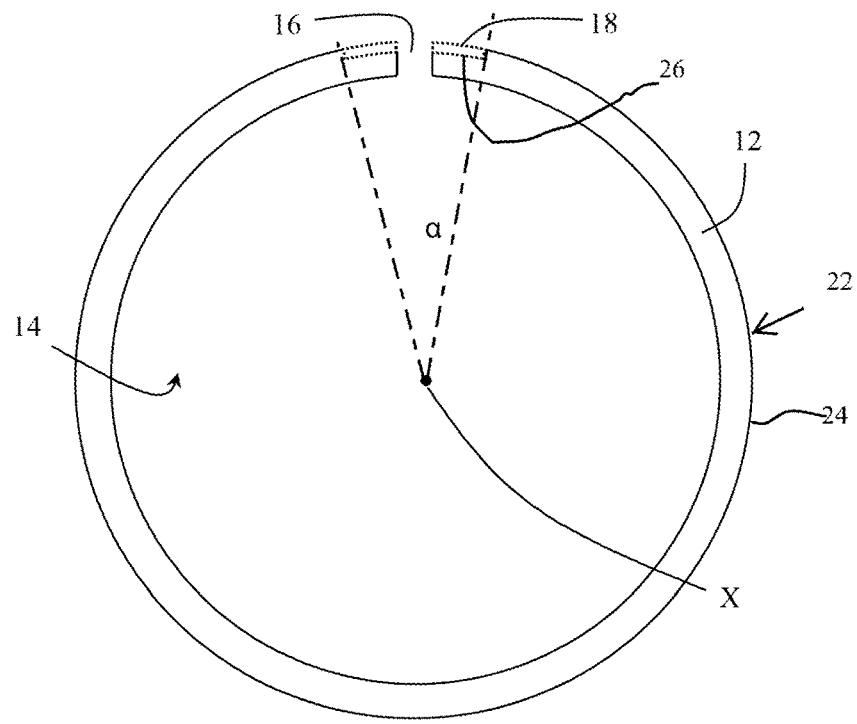
FIG. 2A schematically shows a cross section of the irrigation pipe of FIG. 1 taken along plane II-II illustration a possible embodiment of the irrigation pipe.

Attention is drawn to FIG. 2A schematically illustrating a cross section of an embodiment of pipe 10 taken along a plane generally orthogonal to axis X of the pipe, such as plane II-II marked in FIG. 1. In this embodiment, operative layer 18 is illustrated formed along an outer side of the pipe's wall 12 with the openings 16 penetrating through layer 18 and wall 12 into lumen 14 of the pipe.

Figure 2B:
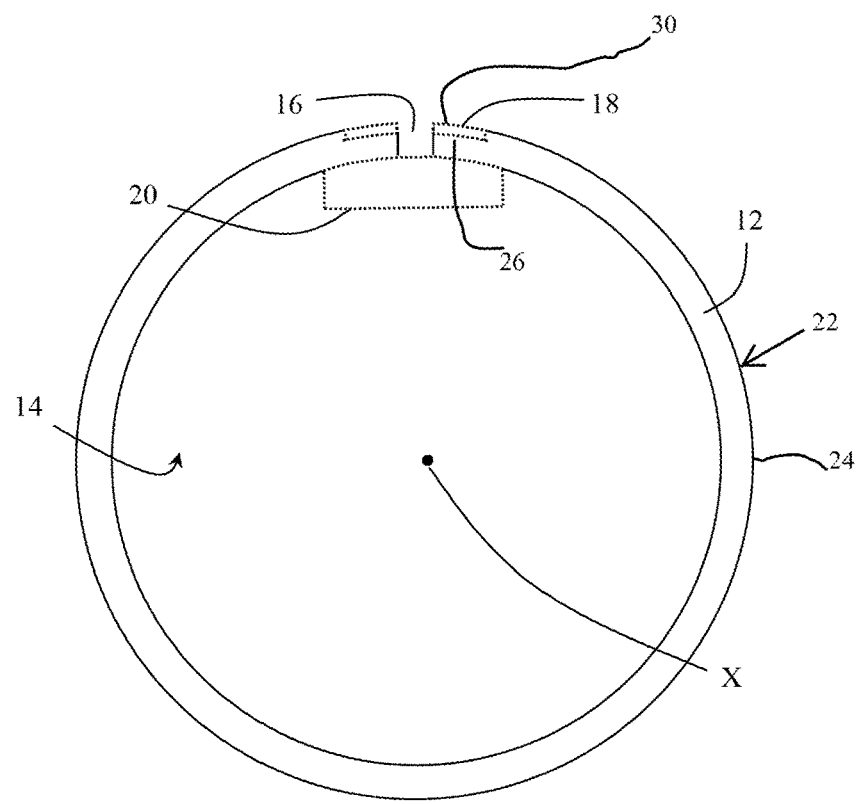
FIG. 2B schematically shows a cross section of the irrigation pipe of FIG. 1 taken along plane II-II illustration another possible embodiment of the irrigation pipe.

Attention is drawn to FIG. 2B schematically illustrating a cross of an embodiment of pipe 10 generally similar to that seen in FIG. 2A, however in this example including an irrigation emitter 20 attached here to an inner side of the pipe's wall. A plurality of emitters such as emitter 20 may be axially attached along the pipe's wall, with each emitter being located adjacent a respective opening formed through the pipe to serve as passageways through which liquid flowing in the pipe can be directed out of the pipe for irrigation.

In an embodiment of the invention, operative layer in a tensile layer formation 18 may be arranged to be formed from materials with a strength-to-density ratio that is higher than a comparative strength-to-density ratio in the remainder material of the pipe.

In a non-binding example, tensile layer 18 in a formation having a relative high strength-to-density ratio, may be made of materials such as: COC, PP or the like.

In certain cases, materials suitable for forming tensile layer 18 may be defined as having a relative high secant-modulus (where secant-modulus when referred to herein being defined according to ASTM D638-14—see section 11). For example, tensile layer 18 in one example may be chosen to be from Polypropylene having a secant-modulus of about 1500 MPa and density of about 0.9 gr/cm^3, while the material of the remainder of the pipe may be formed from Polyethylene having a secant-modulus of about 800 MPa and density of about 0.945 gr/cm^3.

In certain embodiments, filler materials may be added to tensile layer 18 e.g. to increase the layer's secant-modulus. In some cases, the filler materials may act as a "reinforcing" filler.

In yet further embodiments, tensile layer 18 may be defined as a layer having a relative high tensile-strength in relation to tensile strength of material forming the remainder of the pipe wall (where tensile strength possibly being defined acc. to ASTM D638-14).

Possibly, such tensile layer may be formed from a material having a '1% Tension secant Modulus' that may be higher than similar modulus existing in the remainder of the pipe. For example, the '1% Tension secant Modulus' of tensile layer 18 may be greater than about 2000 MPa.

Alternatively, or in addition—increased resistance to tension of tensile layer 18 may be defined by an increased Elastic Modulus of layer 18 in relation to same modulus as present in the remainder material of the pipe.

In some embodiments, such tensile layer 18 may in addition or alternatively include Nano-fillers such as Nano-Graphene, Nano carbon tubes, Nano-clays, Nano-Cellulous (or the like), where such Nano-fillers being designed to form up to about 5% in wt % from the matrix forming tensile layer 18 in a final extruded pipe.

In certain cases, tensile layer may in addition or alternatively be made from PP or PE materials including glass fibers. Such glass fibers may be non-continuous Fibers (short or long) and/or possibly such glass fibers forming between about 5% to about 50% and preferably between about 20% to about 30% in wt % of polyolefin material forming layer 18. In some examples, tensile layer 18 may be formed from COC (Cyclic Olefin Copolymer) material—while in some cases pre-stretched continuous fiber(s) (possibly fiber bundles) (coated or not coated) may be embedded within layer 18 for increasing its tensile strength.

In one example, determination of relative tensile strength properties of a pipe including tensile layer 18 may be defined according to ASTM D638-14. Four sectors may first be marked on a circumference of a drip irrigation pipe in a section of the pipe not including a dripper or tape. Then, five dumbbell shape samples (according to ASTM D638-14) may be cut from each one of the four sectors—resulting in a total of twenty such samples.

In a subsequent step, each one of the samples may then be stretched in a Tensile test machine (according ASTM D638-14, speed 100 mm/min), while recording the yield force and maximum force (In Newtons) obtained for each sample. Then the five samples relating to each sector may be averaged to record an average value for each sector—and existence of material forming a tensile layer 18 according to the various embodiments of the invention, may be identified by a sector having an average result that is higher by about 30% or more than results present in the other tested sectors of the pipe.

In at least certain embodiments, operative layer 18 (in addition or in alternative to forming a tensile) may be arranged to include materials suitable for at least partially limiting formation of biological matter and/or entry of plant roots into passageways of the pipe, such as openings 16.

Operative layer 18 may include operative-material(s) in the form of metallic materials, e.g. copper preferably copper oxide. In addition, operative layer 18 preferably includes such operative-material(s) mixed within polymeric material to consequently form a meltable polymeric substance that can be e.g. extruded and/or co-extruded during manufacturing of the pipe in order to integrally form at least part of the pipe's wall 12.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Furthermore, while the present application or technology has been illustrated and described in detail in the drawings and foregoing description, such illustration and description are to be considered illustrative or exemplary and non-restrictive; the technology is thus not limited to the disclosed embodiments. Variations to the disclosed embodiments can be understood and effected by those skilled in the art and practicing the claimed technology, from a study of the drawings, the technology, and the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage.

The present technology is also understood to encompass the exact terms, features, numerical values or ranges etc., if in here such terms, features, numerical values or ranges etc. are referred to in connection with terms such as "about, ca., substantially, generally, at least" etc. In other words, "about 3" shall also comprise "3" or "substantially perpendicular" shall also comprise "perpendicular". Any reference signs in the claims should not be considered as limiting the scope.

Although the present embodiments have been described to a certain degree of particularity, it should be understood that various alterations and modifications could be made without departing from the scope of the invention as hereinafter claimed.

What is claimed is:

1. A thin walled irrigation pipe having a longitudinal pipe axis and comprising:
    a main pipe portion; and
    a tensile layer, wherein:
        the tensile layer is formed as a continuous strip upon an outer side of the main pipe portion;
        the tensile layer has a higher tensile strength than the main pipe portion, and is configured to increase an overall tensile strength of the pipe; and
        the tensile layer has a higher strength-to-density ratio than a strength-to-density ratio of the main pipe portion.

2. The thin walled irrigation pipe of claim 1, wherein the tensile layer has a secant-modulus higher than a secant-modulus of the main pipe portion.

3. The thin walled irrigation pipe of claim 1, wherein the tensile layer comprises one or more Nano filler materials selected from the group consisting of Nano-Graphene, Nano-clays, and Nano-Cellulose.

4. The thin walled irrigation pipe of claim 1, wherein the tensile layer comprises polymer reinforced glass fibers.

5. The thin walled irrigation pipe of claim 1, wherein the tensile layer comprises at least one of copper and copper oxide.

6. The thin walled irrigation pipe of claim 1, wherein a wall thickness of the pipe ranges from 0.127 millimeters (5 mil) to 0.2032 millimeter (8 mil).

7. The thin walled irrigation pipe of claim 1, wherein in a cross section orthogonal to the pipe axis, the tensile layer extends only along a portion of the pipe's periphery.

8. The thin walled irrigation pipe of claim 1, wherein:
    the pipe comprises a plurality of axially spaced apart apertures for communicating liquid out of the pipe; and
    the apertures are formed through both the main pipe portion and the tensile layer.

9. The thin walled irrigation pipe of claim 8, further comprising:
    a plurality of emitters axially attached along an inner wall of the pipe, each emitter being located adjacent at least one of said apertures.

10. A thin walled irrigation pipe having a longitudinal pipe axis and comprising:
    a main pipe portion having a longitudinally extending recess formed in a main outer surface thereof; and
    a tensile layer located in the longitudinally extending recess, the tensile layer having an exposed outer surface, wherein:
        the tensile layer is formed as a continuous strip upon an outer side of the main pipe portion;
        in a cross section orthogonal to the pipe axis, the tensile layer extends only along a portion of the pipe's periphery; and
        the tensile layer has a higher tensile strength than the main pipe portion, and is configured to increase an overall tensile strength of the pipe.

11. The thin walled irrigation pipe of claim 10, wherein:
    the pipe comprises a plurality of axially spaced apart apertures for communicating liquid out of the pipe; and
    the apertures are formed through both the main pipe portion and the tensile layer.

12. The thin walled irrigation pipe of claim 11, further comprising:
    a plurality of emitters axially attached along an inner wall of the pipe, each emitter being located adjacent at least one of said apertures.

13. The thin walled irrigation pipe of claim 11, wherein:
    in said cross section, the irrigation pipe has a constant thickness along the pipe's periphery.

14. The thin walled irrigation pipe of claim 13, wherein:
    in said cross-section, the exposed outer surface of the tensile layer is continuous with an adjacent main outer surface of the main pipe portion.

15. The thin walled irrigation pipe of claim 13, wherein:
    in said cross-section, the main pipe portion has a first thickness at the recess and the tensile layer has a second thickness; and
    the first thickness is greater than the second thickness.

16. The thin walled irrigation pipe of claim 15, wherein a wall thickness of the pipe ranges from 0.127 millimeters (5 mil) to 0.2032 millimeter (8 mil).

17. The thin walled irrigation pipe of claim 15 wherein the tensile layer has a higher strength-to-density ratio than a strength-to-density ratio of the main pipe portion.

18. The thin walled irrigation pipe of claim 15, wherein the tensile layer has a secant-modulus higher than a secant-modulus of the main pipe portion.

19. The thin walled irrigation pipe of claim 15, wherein:
    the tensile layer comprises one or more Nano filler materials selected from the group consisting of Nano-Graphene, Nano-clays, and Nano-Cellulose; and
    the Nano filler material comprises less than 5 wt % of the tensile layer.

20. The thin walled irrigation pipe of claim 15, wherein:
    the tensile layer comprises polymer reinforced glass fibers; and
    the glass fibers comprise 20 wt % to 30 wt % of the tensile layer.

21. A thin walled irrigation pipe having a longitudinal pipe axis and comprising:
    a main pipe portion; and
    a tensile layer, wherein:
        the tensile layer is formed as a continuous strip upon an outer side of the main pipe portion;
        the tensile layer has a higher tensile strength than the main pipe portion, and is configured to increase an overall tensile strength of the pipe; and
        the tensile layer has a secant-modulus higher than a secant-modulus of the main pipe portion.

22. A thin walled irrigation pipe having a longitudinal pipe axis and comprising:
    a main pipe portion; and
    a tensile layer, wherein:
        the tensile layer is formed as a continuous strip upon an outer side of the main pipe portion;

the tensile layer has a higher tensile strength than the main pipe portion, and is configured to increase an overall tensile strength of the pipe; and the tensile layer comprises one or more Nano filler materials selected from the group consisting of Nano-Graphene, Nano-clays, and Nano-Cellulose.

23. A thin walled irrigation pipe having a longitudinal pipe axis and comprising:

a main pipe portion; and a tensile layer, wherein:

the tensile layer is formed as a continuous strip upon an outer side of the main pipe portion;

the tensile layer has a higher tensile strength than the main pipe portion, and is configured to increase an overall tensile strength of the pipe; and the tensile layer comprises polymer reinforced glass fibers.

24. A thin walled irrigation pipe having a longitudinal pipe axis and comprising:

a main pipe portion; and a tensile layer, wherein:

the tensile layer is formed as a continuous strip upon an outer side of the main pipe portion;

the tensile layer has a higher tensile strength than the main pipe portion, and is configured to increase an overall tensile strength of the pipe; and the tensile layer comprises at least one of copper and copper oxide.

* * * * *